US011801730B1

(12) United States Patent
Vader et al.

(10) Patent No.: US 11,801,730 B1
(45) Date of Patent: Oct. 31, 2023

(54) EFFICIENT CLIMATE CONTROL FOR MULTI-USER AUTONOMOUS VEHICLES

(71) Applicant: Zoox, Inc., Foster City, CA (US)

(72) Inventors: Anup Madhav Vader, San Jose, CA (US); Carter McEathron, Mountain View, CA (US); Paul Raymond Mueller, San Leandro, CA (US)

(73) Assignee: Zoox, Inc., Foster City, CA (US)

( * ) Notice: Subject to any disclaimer, the term of this patent is extended or adjusted under 35 U.S.C. 154(b) by 241 days.

(21) Appl. No.: 17/314,919

(22) Filed: May 7, 2021

(51) Int. Cl.
*B60H 1/00* (2006.01)
*G06Q 50/30* (2012.01)
*G06Q 10/02* (2012.01)

(52) U.S. Cl.
CPC ....... B60H 1/00742 (2013.01); B60H 1/0075 (2013.01); B60H 1/00357 (2013.01); B60H 1/00771 (2013.01); B60H 1/00785 (2013.01); G06Q 10/025 (2013.01); G06Q 50/30 (2013.01); *B60H 1/0073* (2019.05)

(58) Field of Classification Search
CPC .............. B60H 1/00742; B60H 1/0075; B60H 1/00771; B60H 1/00785; B60H 1/0073; B60H 1/00375; G06Q 10/02; G06Q 10/025; G06Q 50/30; G06Q 2240/00
See application file for complete search history.

(56) References Cited

U.S. PATENT DOCUMENTS

| | | | | |
|---|---|---|---|---|
| 9,002,568 B2* | 4/2015 | Datta | ...................... | B60R 16/02 701/29.1 |
| 10,035,403 B2* | 7/2018 | Petrenga | ............ | B60H 1/00978 |
| 2004/0129007 A1* | 7/2004 | Tomita | ............... | B60H 1/00864 62/157 |
| 2005/0267646 A1* | 12/2005 | Ichishi | ................... | G05D 23/27 165/204 |
| 2016/0318467 A1* | 11/2016 | Ricci | ................... | H04L 63/0236 |
| 2017/0036511 A1* | 2/2017 | Lee | .................... | B60H 1/00771 |
| 2017/0327082 A1* | 11/2017 | Kamhi | ............... | B60H 1/00357 |
| 2018/0022182 A1 | 1/2018 | Miller et al. | | |
| 2018/0209803 A1* | 7/2018 | Rakah | .............. | G08G 1/096822 |
| 2018/0218470 A1* | 8/2018 | Belwafa | ................. | G06Q 10/02 |

(Continued)

FOREIGN PATENT DOCUMENTS

| | | | | |
|---|---|---|---|---|
| CN | 107909175 A | * | 4/2018 | |
| DE | 102020105943 A1 | * | 10/2020 | ............. B60N 2/143 |

(Continued)

*Primary Examiner* — Jenna M Hopkins
(74) *Attorney, Agent, or Firm* — EIP US LLP

(57) ABSTRACT

There is provided a method comprising: determining an occupancy status of a first region of a vehicle; determining, based at least in part on the occupancy status, a first climate control setting for the first region; controlling a climate control system of the vehicle to adjust a climate of the first region according to the first climate control setting; determining that a second region of the vehicle is unoccupied, wherein the second region is fluidly connected to the first region; determining a second climate control setting, wherein the second climate control setting is based at least in part on the occupancy status of the first region and characteristic data associated with a predicted potential change in occupancy status for the second region; and controlling the climate control system to adjust a climate of the second region according to the second climate control setting.

18 Claims, 6 Drawing Sheets

(56) References Cited

U.S. PATENT DOCUMENTS

| | | | |
|---|---|---|---|
| 2019/0057480 A1* | 2/2019 | Zhang | G06Q 30/0206 |
| 2019/0171988 A1* | 6/2019 | Kwatra | G06Q 10/06314 |
| 2019/0263231 A1* | 8/2019 | Jabour | B60R 16/037 |
| 2019/0346840 A1* | 11/2019 | Valeri | G05D 1/0088 |
| 2020/0062076 A1* | 2/2020 | Elson | B60H 1/00735 |
| 2020/0156436 A1* | 5/2020 | Urano | B60H 1/00771 |
| 2020/0189350 A1* | 6/2020 | Urano | G05D 1/0088 |
| 2020/0320655 A1* | 10/2020 | Subramanian | G06Q 50/30 |
| 2021/0223051 A1* | 7/2021 | Hochberg | G06Q 10/0631 |
| 2022/0017120 A1* | 1/2022 | Gerrese | G06Q 50/30 |
| 2022/0144168 A1* | 5/2022 | Ito | B60Q 9/00 |

FOREIGN PATENT DOCUMENTS

| | | | | |
|---|---|---|---|---|
| EP | 3772729 A1 * | 2/2021 | | B60H 1/00771 |
| EP | 3806006 A1 * | 4/2021 | | |
| WO | WO-2016029044 A1 * | 2/2016 | | B60H 1/00064 |
| WO | WO-2019117878 A1 * | 6/2019 | | B60H 1/00357 |
| WO | WO-2020108849 A1 * | 6/2020 | | B60H 1/00357 |
| WO | WO-2021037654 A1 * | 3/2021 | | A61M 21/00 |

* cited by examiner

EFFICIENT CLIMATE CONTROL FOR MULTI-USER AUTONOMOUS VEHICLES

BACKGROUND

Climate control systems in autonomous and semi-autonomous vehicles allow the variation of a climate in the interior of the vehicle according to preferences of passengers of those vehicles. The climate may be varied by adjusting air flow and characteristics of the air flow using a heating, ventilation, and air conditioning (HVAC) system connected by ducting to the interior of the vehicle. The climate control system may control the HVAC system according to measurements made by sensors within the vehicle interior, to achieve the desired climate settings. By controlling the climate of the vehicle in this way, passenger comfort can be achieved.

BRIEF DESCRIPTION OF THE DRAWINGS

The detailed description is described with reference to the accompanying figures. The use of the same reference numbers in different figures indicates similar or identical components or features.

DETAILED DESCRIPTION

Figure 1:
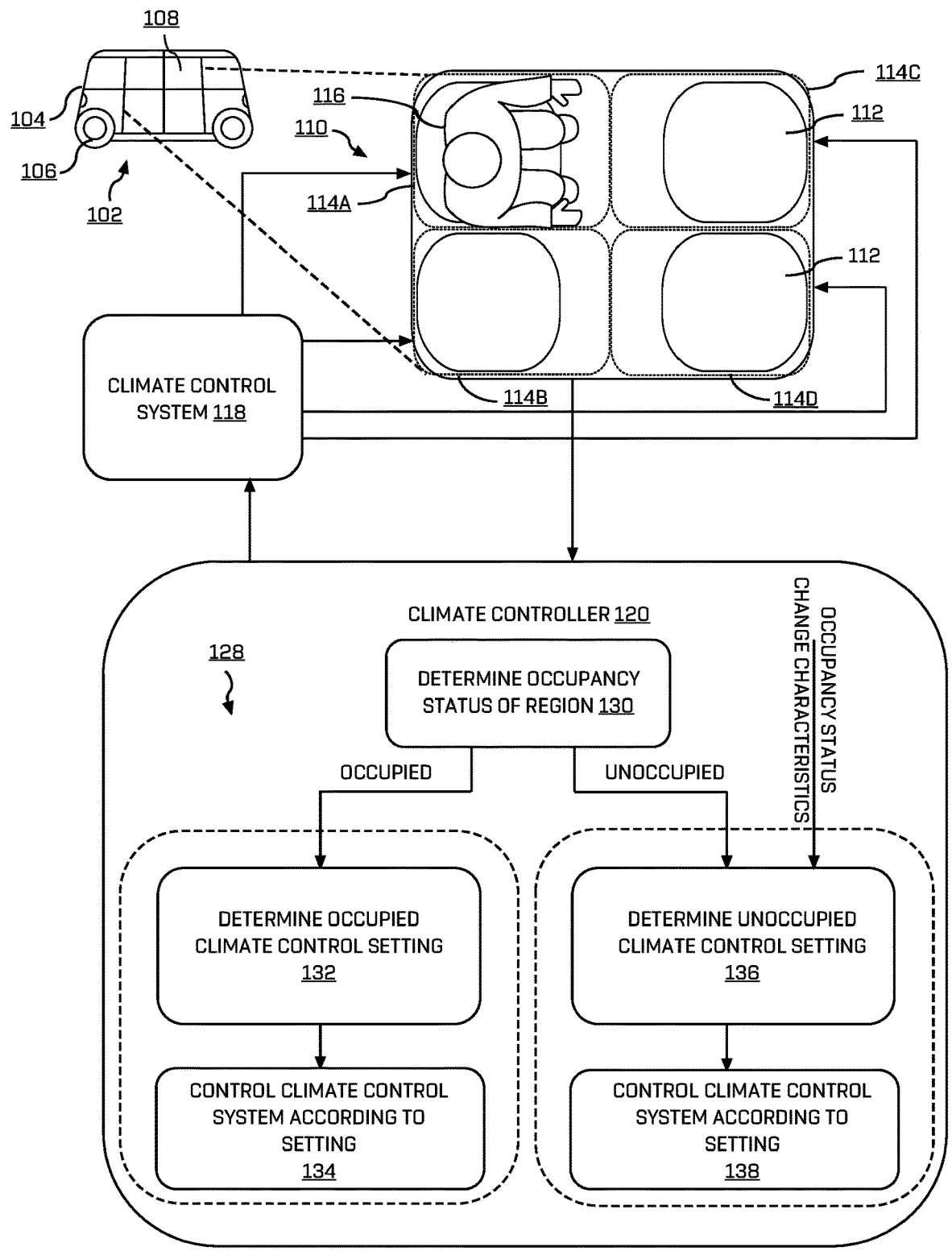
FIG. 1 is a pictorial diagram of a process for controlling a climate control system of an autonomous vehicle.

This application relates to dynamically controlling the climate of regions or zones of an interior of a vehicle according to predicted changes in occupancy of those regions. The dynamic control can be applied in order to balance comfort of vehicle occupants with efficient use of energy which may be correlated to vehicle range and usefulness/profitability. Such adaptive control of, for example, temperature within the interior of the vehicle is useful in electric, autonomous vehicles, where it is preferable to conserve energy if possible so that the vehicle can maximize its operational range. The concepts described herein are applicable to vehicles operating as robotic taxis whose operation may involve several different users occupying the interior simultaneously. Robotic taxis can have a high-frequency turnover of users as users may routinely enter or exit the robotic taxis. Furthermore, each user may be associated with a corresponding climate control environment (e.g., temperature). A robotic taxi's climate control system may therefore dynamically adjust to account for these changes to interior conditions and user parameters.

To implement the climate control described above, a climate control system can operate to control occupied regions and unoccupied regions of the vehicle, possibly applying different criteria for climate control settings in each region. In occupied regions, the climate control system can operate based on the corresponding occupancy of the region and consequently control the climate according to, for example, a user preference or other user-specific data. In unoccupied regions, the climate control system can act to 'float' the climate settings of those regions, based on predicted potential changes in occupancy of the unoccupied region. By implementing a floating control of climate settings, the climate control system can act to minimize its active regulation of the climate within that region, whilst abiding by determined bounds. The climate control system can take into account data relating to future occupancy of a region, and set the climate settings at a level from which a comfortable level for the user can be achieved when the user enters the vehicle. This setting may be adjusted and be allowed to vary based on other factors that affect the climate within the interior of the vehicle. These other factors may include exterior influences such as ambient temperature. Solar heating and/or interior influences such as thermal load of occupants or air flow within the vehicle. Therefore, the climate control system can achieve what may be considered to be an optimal level that balances achieving comfort for future users with energy efficiency, acting to regulate the climate within unoccupied regions of the vehicle.

The control of the climate in the regions of the vehicle may also be based on the occupancy of other regions within the vehicle. By taking into account occupancy of the other regions of the vehicle as well as the current region, the climate control system ensures that the comfort of current users of the vehicle is also balanced with that of future users and energy efficiency objectives.

Accordingly, systems and methods may be provided as described herein. For example, a method to implement the control described above may comprise the steps of determining a first occupancy status associated with a first region of a vehicle; determining, based at least in part on the first occupancy status, a first climate control setting for the first region; controlling a climate control system of the vehicle to adjust a climate of the first region according to the first climate control setting; determining a second occupancy status associated with a second region of the vehicle, wherein the second region is fluidly connected to the first region; determining, based at least in part on the second occupancy status, a second climate control setting, wherein the second climate control setting is based at least in part on characteristic data associated with a predicted potential change in occupancy status for the second region; and controlling the climate control system to adjust a climate of the second region according to the second climate control setting.

The characteristic data may comprise at least one of: a vehicle booking characteristic; a journey type characteristic; a destination characteristic; a current location characteristic; a destination type characteristic; a historic trend; a time of day; a population density; a length of a current trip; or a current occupancy of the vehicle. Where the characteristic data comprises a vehicle booking characteristic, the vehicle booking characteristic may comprise an estimated time indicative of the second region potentially becoming occupied, or at least one of: a booking characteristic for a booking relating to the user occupying the first region; or a booking characteristic for a booking relating to a user that has not yet been picked up.

The method may comprise determining a time required to adjust the climate of the second region according to the second climate control setting; and delaying adjustment of the climate of the second region according to the second climate control setting if the estimated time exceeds the time required.

The second climate control setting may be based at least in part on the first climate control setting. The second climate control setting may be based at least in part on the first occupancy status. Additionally, or alternatively, the second climate control setting may be based on at least one of: user preference data; a current temperature inside the second region; a current ambient temperature outside of the vehicle; a measure of solar load of the vehicle; an estimated climate loss within the vehicle due to operation of a door of the vehicle; an estimated thermal load of a user; a vehicle power source parameter; a measure of humidity of the interior of the vehicle; a rate of travel of the vehicle; a rate of acceleration of the vehicle; or a direction of travel of the vehicle.

The method may comprise: determining that a third region of the vehicle is unoccupied, wherein the third region is fluidly connected to the first region; determining, based at least in part on the third region being unoccupied, a third climate control setting that is different to the second climate control setting; and controlling the climate control system to adjust a climate of the third region according to the third climate control setting.

The method may comprise: determining a climate control objective for the second region, the climate control objective representing a first target climate from which a second target climate is attainable within a predetermined time; and determining the climate control objective as the second climate control setting.

The method may comprise: estimating a climate to which the second region would converge without independent climate control in the second region by the climate control system; and determining the second climate control setting based on the estimated climate.

In some examples, the second climate control setting may be determined based on at least one of a plurality of occupancy prediction states. The occupancy prediction states may comprise: a pickup-requested state in which the autonomous vehicle has received a request from a user that remains to be picked up; and a no-pickup-requested state in which the autonomous vehicle has not received a request from a user that remains to be picked up.

In some examples, the second climate control setting may be based on booking states of the vehicle, wherein the booking states comprise: an unbookable state in which no further booking of the vehicle is permitted; a bookable state in which further booking of the vehicle is permitted but no further booking is yet active; and a booked state in which a further booking of the vehicle is active with respect to a user that remains to be picked up. The method may comprise controlling the climate control system to adjust a climate of the second region in: a first mode for the vehicle in the unbookable state; a second mode for the vehicle in the bookable state; and a third mode for the vehicle in the booked state.

The method may comprise: determining a future condition of the vehicle based at least in part on use of the vehicle by a user corresponding to the first region of the vehicle, wherein the second climate control setting is based at least in part on the future condition.

There may be provided a system comprising: a climate control system; one or more processors; and one or more non-transitory computer-readable media storing instructions executable by the one or more processors, wherein the instructions, when executed, cause the system to perform a method as described above.

The occupancy status of the first region may be determined to be occupied and the occupancy status of the second region may be determined to be unoccupied. The occupancy status of the first region may be determined to be unoccupied and the occupancy status of the second region may be determined to be occupied. The occupancy status of both the first and second regions may be determined to be occupied. The occupancy status of both the first and second regions may be determined to be unoccupied.

There may be provided one or more non-transitory computer-readable media storing instructions executable by one or more processors, wherein the instructions, when executed, cause the one or more processors to perform a method as described above.

FIG. 1 is a pictorial representation of an example climate control process within a vehicle. FIG. 1 shows a side view of an example vehicle 102. The vehicle 102 comprises a body structure 104 supported by four wheels 106, only two of which are shown here. The vehicle body 104 comprises doors 108 to allow users of the vehicle 102 to enter and exit the vehicle 102. Two doors 108 are shown in the side of the vehicle shown in the side view of FIG. 1, and two more doors are provided on the other side of the vehicle 102, which is not visible in this view. The body structure 104 and doors 108 enclose an interior volume, the 'interior' hereafter, 110 when the doors are closed. For the purpose of this application the interior of a vehicle may be considered to include internal surfaces of the vehicle as well as a volume of air enclosed within the vehicle.

A schematic plan view of the interior 110 is shown in FIG. 1. The interior 110 can comprise four seats 112 that are arranged in a 'coffee-table' or 'carriage' style arrangement, so that users sitting in a seat face another seat in the interior 110. The arrangement shown here is for the purpose of the description provided herein, and in other examples, a vehicle may include more or fewer than four seats, and/or the seats may be arranged in any suitable arrangement.

The interior 110 can be split into a plurality of regions 114, here labelled as first, second, third and fourth regions 114a to 114d. A seat 112 can be provided in each region 114a-d. In FIG. 1 the first region 114a is occupied by a user 116 who is sitting in the seat 112 in that region 114a. The second to fourth regions 114b-d are unoccupied and, consequently, no users occupy the seats 112 in those regions 114b-d. The plurality of regions 114a-d, as illustrated, are fluidly connected with each other, such that air flow between regions is possible. The interior 110 of FIG. 1 is shown as having four regions 114a to 114d for the purpose of this description, and in other examples, a vehicle may include more than or fewer than four regions. For example, a vehicle may comprise two regions or three regions. Alternatively, a vehicle may comprise five regions, six regions, or more than six regions.

The example vehicle 102 illustrated in FIG. 1 can be a bidirectional, autonomous vehicle, and can therefore be configured to transport users autonomously between pick-up locations, where one or more users may enter the vehicle, and destination locations, where one or more users may exit the vehicle. As will be appreciated, each user in the vehicle 102 may have a different pick-up and/or destination location. Vehicles such as the vehicle shown in FIG. 1 may be used as robotic taxis, enabling multiple users to occupy the interior volume at a time for transportation between their pick-up and destination locations. A user may submit a booking via a remote server or directly to the vehicle to request the vehicle to drive to a pick-up location to pick the user up and to transport the user to a destination location. While the user is seated within the interior of the vehicle, it is preferable that the user is comfortable. To maintain comfort of the users within the vehicle 102 a climate control system 118 can be provided to regulate the climate within the interior 110 of the vehicle 102.

Although not shown in detail in FIG. 1, the climate control system 118 can comprise devices and/or apparatus for adjusting and controlling the climate within the interior 110. The climate control devices are in communication with the interior of the vehicle to enable regulation of the climate. For example, the climate control devices may comprise heating, ventilation, and air conditioning (HVAC) units that can be in fluid communication with the interior of the vehicle by appropriate ducting. The ducting can enable the HVAC units to regulate air flow within the interior of the vehicle in order to adjust the climate, for example by adjusting temperature, humidity, or other controllable parameters of the air flow. Other heating or cooling devices, such as seat warming devices, or other climate control devices, such as de-/humidifiers may be provided in the vehicle to enable the climate to be changed. An example climate control system is described in U.S. patent application Ser. No. 16/017,424, which is incorporated by reference.

The climate control system 118 can be thermally coupled to each region 114a-d, as represented by the arrows 122, and operable to control the climate of each region 114a-d independently. This may be achieved by providing two HVAC units, one at each end of the vehicle 102, which are each responsible for controlling the air flow in two regions of the vehicle and can vary parameters such as humidity and temperature of the air flow in each region independently.

Figure 3:
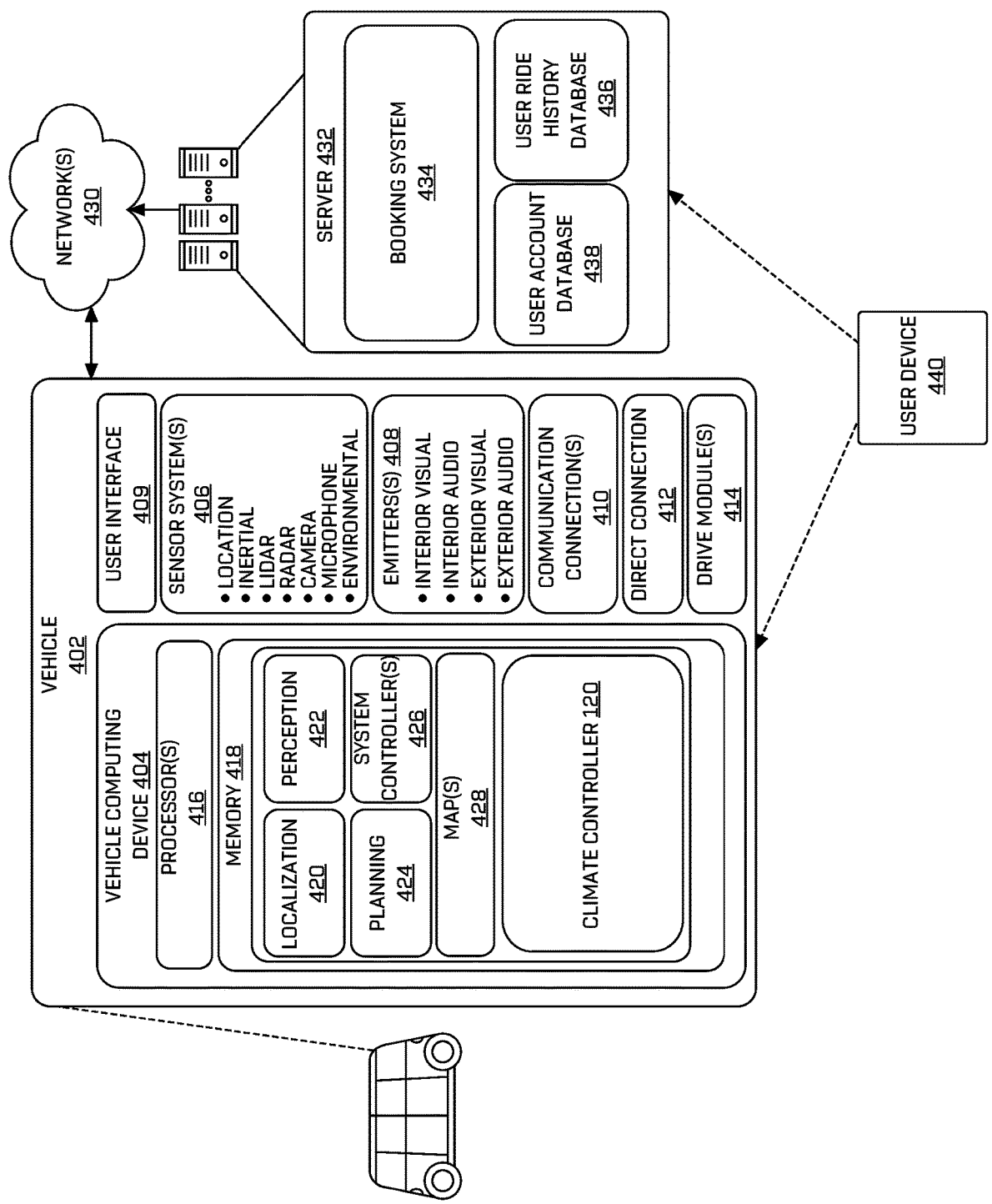
FIG. 3 is an illustration showing an example system for controlling an autonomous vehicle.

The climate control system 118 can be controlled by a climate controller 120. The climate controller 120 can control the climate control system 118 to adjust the climate of each region 114a-d within the interior 110 independently, or to adjust the climate of the interior as a whole, depending upon one or more characteristics. The climate controller 120, which may comprise a processor or an application run by a processor of a wider control system, can be connected to and receives inputs, represented by the arrow 124, from one or more sensors (not shown in FIG. 1) of the vehicle 102 and/or one or more processors (not shown in FIG. 1) of the vehicle 102. Sensors may be configured to monitor measurable parameters of the vehicle interior and/or exterior to provide values for those parameters. Processors may be configured to determine values for one or more parameters based on sensor data or other received data. The climate controller 120 can use the inputs 124 to generate an output control signal, represented by arrow 126, by which the climate control system 118 may be operated. An example of a wider control system of the vehicle 102 within which the climate controller 120 sits is illustrated in FIG. 3 and will be described in detail below.

The climate controller 120 can be configured to control the climate control system 118 to achieve a target climate within the or part of the interior 110. A target climate may be achieved within the interior as a whole, for individual regions, or for combinations of regions, depending on characteristics of the vehicle, such as, for example, occupancy of one or more regions of the vehicle, occupancy of the vehicle as a whole, and/or one or more characteristics associated with the current occupancy or a predicted occupancy.

The climate controller can 120 perform a process 128 to regulate the climate within the interior 110. At step 130, for regions 114a-d of the interior 110, the occupancy of the region 114a-d is determined. The way in which the climate control setting is set for each region 114a-d is a result of this determination. The occupancy may be determined based on one or more occupancy inputs, as will be described in relation to FIG. 4.

If the determination of the occupancy status at step 130 indicates that a region is occupied, an occupied climate control setting is determined, at step 132. In other words, the occupied climate control setting is determined based on the occupancy of the region. In some examples, when it is determined that a region of the vehicle is occupied, an occupied climate control setting is determined based on user-specific data. Put another way, the climate control setting for occupied regions may depend upon the user and may be set according to preferences and data associated with the user.

Continuing with FIG. 1, at step 134, the climate control system 118 can be controlled according to the climate control setting in order to achieve the target climate desired for the user occupying the region. The climate control system 118 can be controlled according to the climate control setting or one or more values based on or derived from the climate control setting that, according to the climate controller 120 will achieve the target climate within the targeted region.

For unoccupied regions of the vehicle, the process shown in FIG. 1 as being performed by the climate controller 120, at step 130 the occupancy status of the region can be determined to be unoccupied. In response to determining that the region is unoccupied, an unoccupied climate control setting can be determined for the unoccupied region at step 136. The unoccupied climate control setting can be determined based, at least in part, on the occupancy status of that region being determined to be unoccupied.

The unoccupied climate control setting may also be based on the occupancy status of another region of the interior of the vehicle. In other words, the determination can be dependent upon whether another region is occupied or unoccupied.

Additionally, the unoccupied climate control setting may be based on characteristic data associated with a predicted potential change of occupancy status of that region, referred to as an occupancy status change characteristic in FIG. 1. The characteristic data associated with a predicted potential change of occupancy may, in some examples, be determined by the climate controller 120 before or after determining that a region is unoccupied. Changes of occupancy occur in a region of an autonomous vehicle such as the one shown in FIG. 1 when a user enters the vehicle and occupies the seat within that region. The change in occupancy typically occurs because the user desires to be transported by the vehicle from a pick-up location to a destination location. Where the vehicle is operating as a taxi service, and more particularly as a driverless, autonomous 'robo' taxi, the user typically sends a request to a central server to book transportation from a vehicle in a fleet comprising a plurality of such vehicles. The central server may then determine a vehicle which is closest to the user, or otherwise best suited to fulfil the request and instruct that vehicle to navigate to the user's pick-up location to allow the user to enter the vehicle. Therefore, there are a number of different factors that influence the potential for a vehicle to have a change of occupancy, associated both with booking characteristics and with location and journey characteristics. To briefly expand on this now, before it is explained in more detail later on, the vehicle may be configured to operate in specific states which can influence a change of occupancy is, or may be driving within a specific location that means that a requirement to pick a user up is less or more likely. Accordingly, based on monitored data, both available to the vehicle immediately and historic data, a prediction may be made relating to a potential change in occupancy, or a predicted potential change in occupancy determined. Characteristics associated with such a prediction, such as the factors described above, may be used to determine the climate control setting of unoccupied regions. These characteristics is discussed below in relation to FIG. 4 and will be put into the context of a specific example in FIG. 5 and FIG. 6.

While the predicted potential change of occupancy status is discussed herein as being used to determine an unoccupied climate control setting, it will be appreciated that the occupied climate control setting may also be based, at least in part, on the predicted potential change of occupancy status. Description herein related to the predicted potential change of occupancy status is also applicable to occupied regions of the vehicle. Similarly, discussions of the use of occupancy of other regions to determine a climate control setting are also applicable to occupied regions.

According to these characteristics, the climate control setting can be determined pre-emptively and proactively to ensure that a suitable temperature for a user can be achieved for the user upon entry to the vehicle. The climate control setting can be determined to reflect characteristics associated with the predicted potential change in occupancy, such that more precision and control can be provided over the climate of the region where the potential for a change of occupancy is greater. Similarly, where the potential for a change in occupancy is low, the climate control setting may be less precise, with regard to an expected target temperature for users.

As with the occupied region, at step 138, the climate in the unoccupied region can be controlled according to the climate control setting determined in the previous step. Specifically, the climate controller 120 can control the climate control system 118 according to the climate control setting in order to achieve the target climate. To do this, by the arrangement of FIG. 1, the climate control system 118 can be controlled to meet specific parameters, that, according to the climate controller 120 will effect the target climate within the region.

The process 128 may be applied to the interior 110 shown in FIG. 1, for example to the second, unoccupied region 114*b* and one or more of its adjacent regions, such as the first region 114*a*. For the first region 114*a*, the occupancy status of the first region 114*a* can be determined. A first climate control setting can be determined based on the occupancy status for the first region, and the climate control system 118 can be controlled according to the first climate control setting to implement the setting in the first region 114*a*. In FIG. 1, the occupancy status of the first region is occupied, and the climate control setting is determined based on this occupancy status.

For the second region 114*b*, an occupancy status for the region is determined. A second climate control setting can be determined based on the occupancy status for the second region, and the climate control system 118 is controlled according to the second climate control setting to implement the setting in the second region 114*a*. In FIG. 1, the occupancy status of the second region is unoccupied, and the climate control setting is determined based on this occupancy status. The second climate control setting may therefore be determined based on a predicted potential change in occupancy of the second region.

In other embodiments, the first region may be unoccupied and the second region may be occupied, or both regions may be unoccupied, or both regions may be occupied. Although the example of FIG. 1 illustrates the use of the predicted potential change in occupancy status forming the basis for the unoccupied climate control setting, it will be appreciated that the determination of a climate control setting based on a predicted potential change of occupancy status may be performed for occupied or unoccupied regions. A method may therefore be described, comprising determining a first occupancy status associated with a first region of a vehicle, determining, based at least in part on the first occupancy status, a first climate control setting for the first region, and controlling a climate control system of the vehicle to adjust a climate of the first region according to the first climate control setting, and determining a second occupancy status associated with a second region of the vehicle, wherein the second region is fluidly connected to the first region, determining, based at least in part on the second occupancy status, a second climate control setting, wherein the second climate control setting is based at least in part on characteristic data associated with a predicted potential change in occupancy status for the second region, and controlling the climate control system to adjust a climate of the second region according to the second climate control setting.

The process can be performed for each of the different regions 114*a-d*, such that climate control settings are determined for each region 114*a-d* independently, based on their occupancy statuses at least, and the climates within the regions 114*a-d* controlled simultaneously according to the climate control settings. For example, the third region may be controlled according to the process shown in FIG. 1 for unoccupied regions. As will be appreciated, when the different regions are controlled, their relative positioning in the vehicle and the influences on the temperature in those regions as a consequence of the relative positioning has an effect on how the temperature setting of that region is controlled.

The process may further comprise monitoring the climate of a region and comparing the monitored climate with the climate control setting for that region. The process may comprise operating the climate control system 118 to adjust the climate according to the climate control setting. For example, a feedback signal may be generated to be used to adjust the climate control settings and/or control parameters of the climate control system 118.

The climate control settings may comprise one or more target or limit values for variables associated with the climate control system, such as temperature, humidity, air flow velocity, or air flow volume of the interior or specific region. In some embodiments, the climate control setting may comprise a rate of change of a variable, including start and end points for a variation in the variable. In some embodiments, the climate control setting may comprise a range of allowable values and/or a deadband, outside of which climate control is implemented. The climate control setting may set a hysteresis condition. In some embodiments, the climate control setting may comprise one or more target climate control objectives. A climate control objective may comprise a result or condition according to which the climate is controlled.

The climate control setting may represent a climate control setting to be achieved at a specific position within the interior or as an average across the region, or may be a control parameter for controlling the climate control system. For example, the climate control setting may represent a temperature at a position within the region that a user's head will occupy. The sensors within the interior may be positioned at positions that are not the position that the climate control setting is specified for. The climate controller 120 may be configured to determine whether the climate control setting is being met by extrapolating or otherwise interpreting data received from sensors at other positions. In another example, the climate control setting may be an average setting, and the climate controller 120 may determine that the climate control setting is being met by taking an average of a plurality of different sensor measurements. In other examples, the climate control setting represents a control parameter for the climate control system 118, such that, for example, ducts, vents, and heating or cooling devices connected to the interior are operated to operate according to the control parameter.

Figure 2:
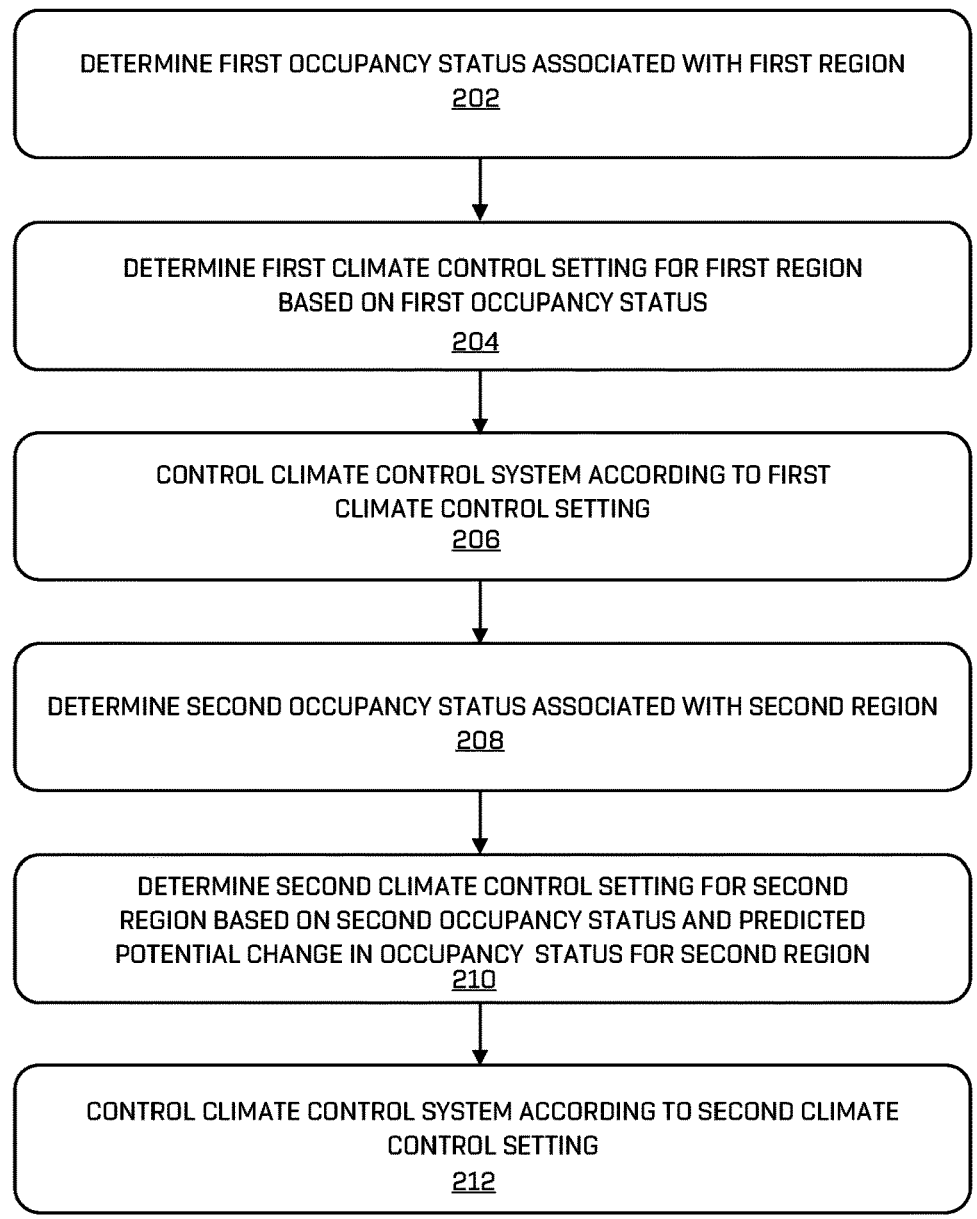
FIG. 2 is a flow chart illustrating a method for controlling a climate control system of an autonomous vehicle.

The process 128 shown in FIG. 1 may also be expressed as a flow chart of a method as shown in FIG. 2. In FIG. 2, there is shown a method 200, which concerns the operation of a climate control system, such as the climate control system 118 of FIG. 1, for two regions of a vehicle that are fluidly connected. For example, the two regions may be the first region 114A and second region 114B, or may be any combination of regions within a vehicle that are fluidly connected. The two regions in the method 200 are referred to as the first region and the second region, but these may be different regions to the first region 114A and second region 114B of FIG. 1.

At step 202 of the method 200, a first occupancy status associated with a first region of a vehicle is determined. At step 204, a first climate control setting for the first region is determined based at least in part on the first occupancy status. At step 206, a climate control system of the vehicle is controlled to adjust a climate of the first region according to the first climate control setting. At step 208, a second occupancy status associated with a second region of the vehicle is determined. The second region is fluidly coupled to the first region. At step 210, a second climate control setting is determined based at least in part on the second occupancy status and at least in part on characteristic data associated with a predicted potential change in occupancy status for the second region. At step 212, the climate control system is controlled to adjust a climate of the second region according to the second climate control setting. Although these steps are shown sequentially in FIG. 2, it will be appreciated that steps 202, 204, and 206 may be performed before, after, or simultaneously with steps 208, 210, and 212.

By the process 128 of FIG. 1 and/or the method of FIG. 2, the climate controller 120 may be operated to control the climate of the interior 110 of the vehicle 102 differently depending on whether the vehicle is entirely unoccupied or if one or more regions 114a-d are occupied by a user. Where the vehicle is wholly unoccupied, a climate control setting may be determined to be different to a climate control setting determined where a region is occupied, because the regions are fluidly connected and as such air flow between regions may contaminate the different climates. Therefore, the determination of a climate control setting for an unoccupied region may be based on the occupancy of at least one other region within the vehicle to ensure that the climate is controlled in a manner that maintains comfort of occupying users, whilst fulfilling objectives relating to energy efficiency. By controlling the climate of unoccupied regions in this way, the current state within the vehicle 102 may be taken into account as well as a future state within the vehicle. A combined approach such as this enables the comfort of users both current and future to be balanced with the energy efficiency objectives of the vehicle.

Furthermore, by implementing the processes shown in FIG. 1 or the method of FIG. 2, a so-called "floating" control of the climate within the unoccupied regions can be achieved, in which the requirements for achieving user comfort as quickly as possible once a user is within the vehicle are balanced with the aim of conserving energy. As used herein, a "floating" control can indicate that a temperature or other climate control setting is left uncontrolled (e.g., it floats to a condition influenced by the environment absent direct control by a climate control system). However, in certain examples, several different intermediate floating settings may be implemented in a graduated manner. For example, a first floating value can be set as previously described where substantially no direct control by a climate control system is performed and a second floating value can be set between the first floating value and a control setting for a specific user or a region (e.g., when occupied by a user). The control of the climate within the unoccupied region can be varied according to parameters and characteristics associated with the vehicle and users, to ensure that there is an optimized control. By basing the climate control setting determination on characteristic data associated with a predicted potential change in occupancy, specifically while there is another region occupied, the climate control system can avoid the two extremes of whole-vehicle temperature control during journeys where only a part of the interior is occupied and inactivity while a region is unoccupied, which both may result in high energy consumption. Instead, the proactive approach to temperature control, in some cases before it is even known that a user will be entering the vehicle, ensures that the energy available to the vehicle is conserved.

Figure 4:
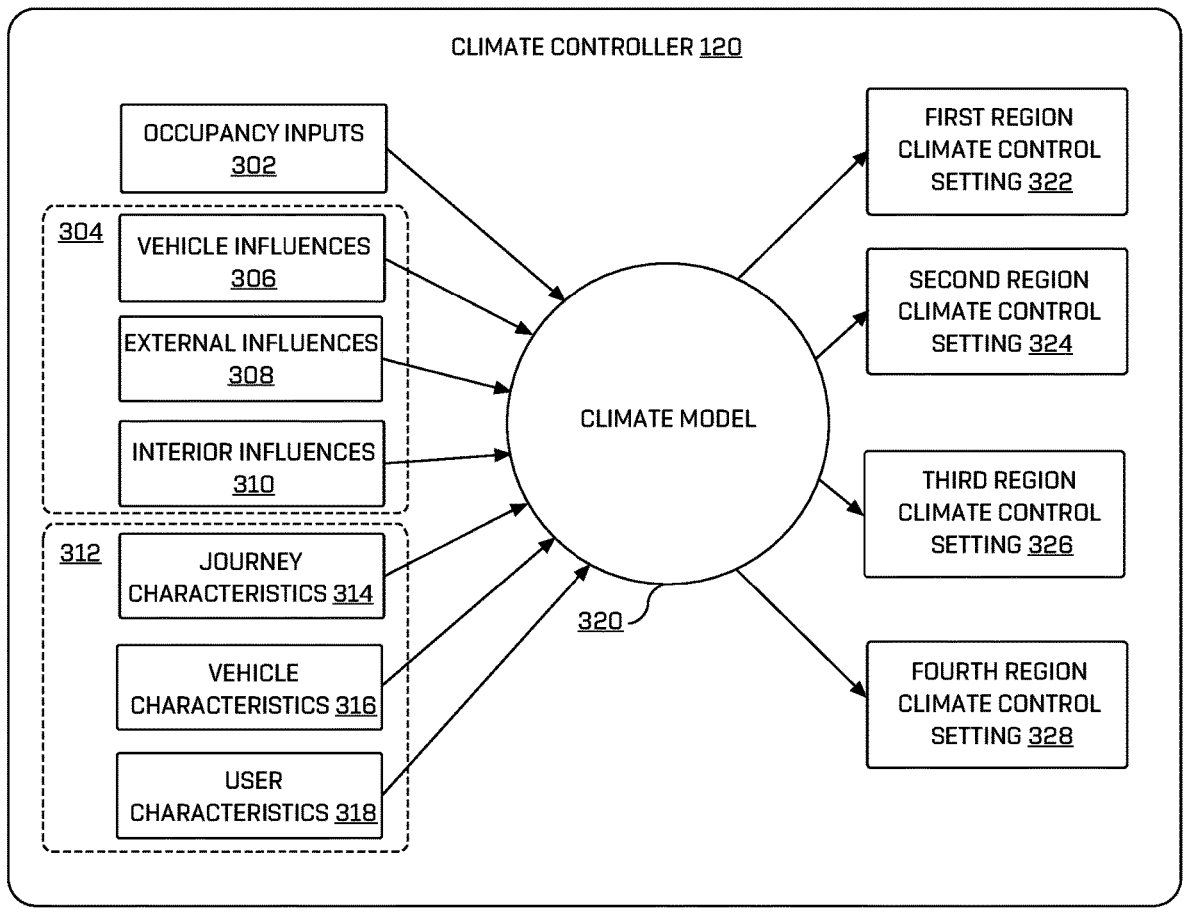
FIG. 4 is an illustration showing an input-output model for controlling a climate control system.

In the process 128 and the method 200, the determinations of occupancy and of the climate control settings can be made utilizing inputs from different systems, devices, and sensors of the vehicle. To aid with the explanation of the variety of different ways for determining occupancy, and for the data and characteristics on which the climate control settings may be based, FIG. 3 and FIG. 4 are provided. FIG. 3 illustrates a block diagram of a system associated with controlling the vehicle. FIG. 4 illustrates a block diagram of an input/output model of a climate controller 120.

The system 400 of FIG. 3 includes a vehicle 402, which may correspond to the example vehicle 102 shown in FIG. 1. The vehicle 402 includes a vehicle computing device 404, one or more sensor systems 406, one or more emitters 408, a user interface 409, one or more communication connections 410, at least one direct connection 412, and one or more drive modules 414. Examples of the sensor systems 406 and of the emitters 408 are shown in FIG. 3. In some embodiments, other sensor systems 406 and/or emitters 408 may be included in the vehicle as desired. In some embodiments, some or all of the listed sensor systems 406 and/or emitters 408 may not be included as part of the vehicle 402. The vehicle 402 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 402 may be configured to control all functions from start to completion of the trip, including all parking functions, it may not include a driver and/or controls for driving the vehicle 402, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled. Therefore, in other examples, the vehicle may be a semi-autonomous vehicle.

Returning to FIG. 3, the vehicle computing device 404 includes one or more processors 416 and memory 418 communicatively coupled with the one or more processors 416. In the illustrated example, the vehicle 402 is an autonomous vehicle. To implement autonomous functionality, the memory 418 of the vehicle computing device 404 stores a localization component 420, a perception component 422, a planning component 424, one or more system controllers 426, one or more maps 428, and the climate controller 116. Though depicted in FIG. 2 as residing in memory 418 for illustrative purposes, it is contemplated that the localization component 420, the perception component 422, the planning component 424, the one or more system controllers 426, the one or more maps 428, and the climate controller 120 may additionally, or alternatively, be accessible to the vehicle 402 (e.g., stored on, or otherwise accessible by, memory remote from the vehicle 402).

An example of this remote memory is a remote server 432. Although not depicted here, the remote server 432 may store the above components and controllers and the processor 416 may access these as required from the remote server 432 via a network 430 that connects the vehicle 402 and the server 432. A remote server, such as remote server 432, may be responsible for taking and coordinating bookings for the vehicle 402. The remote server 432 may include a database 438 storing user account and preference data. The remote server 432 may also comprise a ride history database 436. The ride history database 436 may in some examples be part of the user account database 438. As shown, the server 432 may communicate with a user device 440. It is envisaged that this communication can also be over a network. In some embodiments, the network may be a wide-area network such as the Internet. The user device 440 may also communicate with the vehicle 402. The communication between the user device 440 and the vehicle 402 may be limited to when the user device is within close proximity to the vehicle, so that the user can only communicate with the vehicle via the user device when they are seated within the interior of the vehicle. This proximity restriction may be achieved by specifying that communication between the user device 440 and the vehicle 402 is performed via a short-range protocol such as Bluetooth® or by connecting a localized network within the vehicle.

As shown in FIG. 1, the climate controller 120 can initially determine an occupancy status of each region. The occupancy may be determined based on one or more occupancy inputs, as depicted in FIG. 4. The occupancy inputs 302 may comprise sensor data and/or other determinations associated with the occupancy of the vehicle. The sensor data may be received from the one or more sensors 406 provided internally within the vehicle. For example, the sensors 406 may comprise pressure sensors within the seat and/or cameras within the interior of the vehicle. The occupancy inputs 302 may comprise data received from a processor or other system that counts when a user enters or exits the vehicle and provides occupancy data accordingly.

The occupancy inputs 302 may be considered to represent the current occupancy state of the vehicle. The occupancy inputs 302 provide a snapshot of the vehicle at the current time and dictate how the climate control setting should be determined, as well as the parameters on which those determinations should be made.

The climate control settings can be determined for the occupied and unoccupied regions in the process 128 and method 200 shown in FIG. 1 and FIG. 2 may be based both on a current state of the vehicle, i.e. the occupancy status, and a future state of the vehicle, i.e. predicted changes in occupancy status and the characteristics associated with that change and potential changes. In FIG. 4, these characteristics associated with the future state, i.e. the predicted potential change in occupancy status, are referred to as characteristics 312. In FIG. 4, these characteristics 312 are shown to be inputs to a climate model 320 from which the climate control settings may be output. As there are four regions of the vehicle in this example, the climate model 320 provides climate control settings 322, 324, 326, 328 for the first to fourth regions respectively. Although a climate model is depicted here, it will be appreciated that the climate control settings may be determined in any suitable way based on at least the occupancy status of another region and characteristic data associated with the predicted potential change in occupancy status as described above.

In addition to the characteristics 312, the climate control settings 322, 324, 326, 328 may also be based on one or more other parameters that influence how the climate within a region may vary other than by regulation by the climate control system 118, so that the climate controller 120 can account for variations in temperature and proactively control the climate control system 118. These other parameters are referred to in FIG. 4 as influences 304. Influences 304 may be categorized as a vehicle influence 306, an external influence 308, or an interior influence 310. The influences 304 may be used to determine a condition of the vehicle, a condition change of the vehicle, and/or a future condition of the vehicle. The influences 304 may indicate how the climate within the interior 110 will vary based on, for example, the external ambient temperature, solar load, the thermal mass of users within the interior, doors opening and closing, and/or the air flow within the vehicle due to movement of the vehicle. Accordingly, the climate control settings may be, at least in part, based on these influences, and can also be used to enable control parameters to be determined by which the climate control system 118 may be controlled.

Within the balance of the current vehicle status and future vehicle status, the influences 304 represent the change in climate between the current status and the predicted future status. It can be useful to quantify and account for these influences to ensure that the climate control settings can be adequately implemented and without introducing inefficiencies in energy usage.

Beginning with the influences 304, the climate control setting may be based on one or more vehicle influences 306, such as a vehicle power source parameter, a rate of travel of the vehicle, a direction of travel of the vehicle, or a booking state of the vehicle. Specific vehicle influences, such as rate of travel, acceleration of the vehicle, and direction of travel of the vehicle influence how the air within the vehicle moves, thereby influencing temperature experienced by users in the regions of the vehicle in which the air is moving. Accordingly, when determining settings for the climate control system 118, the climate controller 120 can take account of these influences 306 to ensure that the user is comfortable.

Vehicle influences such as rate of travel, acceleration of the vehicle, and direction of travel influence how air flows around the exterior of the vehicle, thereby influencing heat transfer and cooling effects between the interior and exterior of the vehicle. The direction of travel influences where the cooling is applied, with a greater heat transfer and cooling effect being experienced in the regions at the front of the vehicle relative to the direction of travel when compared to those at the rear. The magnitude of the cooling effect is dependent on rate of travel, acceleration, and other influences such as ambient temperature, movement of air exterior to the vehicle, and solar heating, as will be discussed below.

A vehicle power-source parameter may indicate whether an amount of power available is sufficient to allow a climate control setting to be implemented. In situations where available power is lower than a threshold, the climate controller 120 may determine that no climate control may be provided or that climate control should be minimized, and therefore set different, less energy-intensive settings. A vehicle power source parameter may therefore comprise a charge status of the vehicle. A booking state may be used to determine when particular actions may occur, such as changes in other influences when doors open or users enter or exit the vehicle.

A climate control setting may also be based on one or more external influences 308, such as a current ambient temperature outside of the vehicle, a measure of solar load of the vehicle, or a current ambient humidity outside of the vehicle. These influences 308 on the climate within the vehicle may be measured based on readings from exterior sensors or from data communicated to the climate controller 120 from external sources such as the remote server 432. These influences 308 may cause heating or cooling effects on the vehicle from outside, and therefore need to be taken into account when determining settings for each region.

The measure of solar load may comprise direct, instantaneous solar loading, and/or predicted solar loading. Predicted solar loading may be determined based on the direction of travel of the vehicle, determined using a gyroscope sensor or other compass sensor, and a position of the sun relative to the vehicle for the time of day. Predicted solar loading may also be based on weather forecasting, predicted shading based on a map of the surrounding environment, and/or rate of travel of the vehicle.

One or more interior influences 310 may be used to determine the climate control settings, including a current climate control setting for another region, user preference data, a current temperature inside vehicle or the specific region, an estimated climate loss within the vehicle due to current operation of a door of the vehicle, an estimated thermal load of a user currently occupying the region, an estimated thermal load of all users currently occupying the vehicle, a measure of humidity of the interior of the vehicle, an occupancy prediction state, or a future influence of a user occupying a different region of the vehicle. Each of these influences may be determined based on one or more sensor readings and/or booking data. For example, a suspension pressure gradient and seat occupancy sensor may together or separately be used to determine the thermal mass of one or more users. Thermal mass may also be determined based on suspension pressures measured during previous journeys.

The climate control setting for an unoccupied region may also be based on a climate control setting for a different region. Because the regions are fluidly connected, the climate of one region may influence another, particularly if there is a large difference between the values of a parameter, for example temperature, of each climate. Accordingly, by controlling the climate control setting based on other climate control settings, a reactive system is developed whereby the region-specific climate control settings interact with one another creating a control that is simultaneously precise and generalized. In some embodiments, the climate control setting for an unoccupied region may also be based on a climate control setting for a plurality of different regions.

As noted above, a future influence or a future condition of the vehicle may be determined. A climate control setting for a region may be based on a future influence. A future influence may be considered to be an influence that is not currently influencing the climate within the vehicle but may in future. A future influence on or condition of the vehicle may be determined based on a current occupancy status of the vehicle or a predicted occupancy status of the vehicle. A future influence may comprise a future door status, such as when a current user exits the vehicle, thereby causing air flow into the vehicle from the exterior or when a new user enters the vehicle. A future influence may also comprise a future climate control setting, which may be based on a future bookings, expected bookings, and/or other predicted events such as a weather forecast or a trend indicating changes in demand. A future influence may also comprise a change in the thermal mass of the occupants, an expected variation in direction of travel, or any other influence that may be predicted.

Moving now to the characteristics 312, these may be based on whether a region is occupied or not and whether the surrounding regions are occupied or not. When considering the process 128 of FIG. 1, in a first instance, as shown on the left-hand side of the climate controller 120 of FIG. 1, a region is determined to be occupied. The climate control setting for an occupied region may be based on user characteristics 318. User characteristics 318 may comprise user data such as data input directly by the user prior to or during the journey, data stored in memory relating to the user and determined based on earlier journeys that they user has taken, and/or data determined by the vehicle and control systems without input from the user. Data may be input by the user into their user device 440 or via a user interface 409 within the vehicle. The data determined by the vehicle and control systems without input from the user may be trend data or may be related to a perceived current condition of the user.

Data provided by the user, such as pre-determined or in-ride data, may be described as user-preference data. User-preference data may comprise data specifically provided by the user during the journey or prior to the journey for the purpose of climate control. User-preference data may comprise a selection by the user of a preferred climate control setting, such as a preferred temperature level or air flow level.

User-preference data may be determined based on data previously entered by the user during a ride. The climate controller 120 may receive input from or access a user account stored for the user in the databases 436, 438 of the remote server 432 in order to determine either pre-stored preference data or data relating to previous journeys, 'ride history data', in which the user provided user-preference data. For example, if a user input a target temperature of 23 degrees Celsius in a previous ride, the climate controller 120 may set the target temperature of 23 degrees Celsius for a current journey by that user until the user inputs a new target temperature when seated within the vehicle.

In some examples, the user data may be determined based on data determined by the vehicle computing device 404 or by the server 432. In other words, sensed or monitored inputs relating to the user may be used to determine a condition of the user, from which a climate control setting may be determined. For example, environmental factors relating to the location of pick-up of the user may be used to determine a climate control setting. The climate controller 120 may be configured to determine the location from which the user was picked-up and the journey began, and from the location determine one or more characteristics indicative of a condition of the user. For example, the characteristics may include an outdoor ambient temperature, whether the user has been standing in sun or shade, or whether the user is exposed to the wind. These may be received based on a map 428 of the pick-up location and/or one or more sensors of the vehicle. For example, environmental factors may be determined by cameras. Based on these characteristics, it may determined whether to set, for example, a higher-than-ambient temperature setting or a lower-than-ambient temperature setting.

The climate controller 120 may also receive data that allows a condition of the user to be predicted, such as the above data as well as input relating to waiting time of the user, based on an elapsed time between the request for a pick-up being received and the user being picked-up. It may be determined that the user will be cold if they have been waiting a relatively long time, it is cold outside, and they have been at the park, based on their location. Accordingly, the climate control setting may be determined to be a target temperature significantly warmer than the outdoor ambient temperature. Alternatively, if it is determined that the user has been to the gym, for example, because their pick-up location is outside a gym, the climate control setting may be determined to be a target temperature that is cooler than the ambient, outdoor temperature, in order to cool the user down because of their predicted condition of being hot. In another example, a distance the user has walked to the pick-up location may be determined based on there being a difference between the location from which the request for a ride was received and the pick-up location. A rate of walking may be determined based on the distance and the time elapsed between the request being received and the vehicle arriving at the pick-up location. A condition of the user may be predicted based on the rate of walking. These characteristics may be determined based on one or more maps 428, as well as by the perception component 422. As disclosed herein, a time to pick up a user can be used as a basis for determining an amount of time that a climate control setting can be left to float (e.g., by subtracting, from the time to pick up a user for a specific region the time required to bring the region from the floated setting(s) to setting(s) for the user).

A time to pick up an occupant for a vehicle can be estimated for those conditions when the time cannot be more directly ascertained (e.g., by already having an active request to be picked up by a user and estimating a time to reach the user). For example, a robotic taxi service as described herein may operate in relatively dense urban environments wherein times to pick up future occupants may be relatively short and sporadic. In such instances, an estimated pick up time can be used to determine a time that a climate control setting can be left to float to enhance power savings of the vehicle. For example, population density, historic times for pickup or users, map information, traffic information, interceding occupant actions, and other information can be used to estimate a time to pick up. In certain examples, it can be determined that an estimated time to pick up is too short to enable a climate control system to be fully floated such that a climate control system does not influence the climate of a corresponding region. An intermediate float value may otherwise be chosen that conserves power while still allowing enough time for climate control settings to be set for a corresponding user.

In some examples, a time to pickup a user can be modeled as a heat map wherein a geographic area can be modeled as a discrete set of cells each corresponding to a respective expected pick up time. Thus, as a vehicle changes position geographically and enters differing cells, the current cell that a vehicle is occupying can be used to determine an estimated time to pick up a user. As disclosed herein, heatmaps values can change based on time of day, weekday vs weekend, in response to a certain event, weather patterns, road closures, or other information.

In certain examples, an estimated time to pick up can be determined based on a passenger party size. For example, two or more seat locations (each of which may correspond to a respective region or can be combined into a single region) may be reserved for larger parties to optimize operation of a fleet of robotic taxis. Thus, a time to pickup a party of potential occupants can be estimated rather than individual occupants.

In examples, a state of a door of the vehicle can be taken into account en-route to pick up a potential occupant. As disclosed herein, a door being open in a vehicle can have substantial affects on the climate within the vehicle. For example, an open door may negate climate control of a climate control system. As such, an expected door opening and/or time that a door is open can be used to determine an amount of time remaining to climatize a region within the interior of a vehicle to correspond to preferences or settings associated with a future user. As one example, a climate control system may begin to regulate an interior climate region in anticipation of being occupied, but an intervening stop for an occupant/potential occupant of a different region may cause the doors to open and may cancel out the effects of the climate control system. Using techniques disclosed herein, such an event may be anticipated and, in response, a climate control system may account for a potential state of a door by, for example, refraining from floating a region until a later time or more aggressively regulating climate controls therein.

In some examples, future settings of one climate control region within an interior of a vehicle and its effects on a different region can be used accounted for. For example, one region may not currently be occupied but may be anticipated to be occupied by a user at a future time and thus control of the region may change over time. As the region may influence another region within the vehicle, the future effects of the change in one region can be taken into account when estimating time and/or settings for climatizing a different region for a corresponding user.

In some examples, the climate control setting may be determined based on a perceived condition of the user. A perceived condition of the user may be determined based on sensors of the vehicle and the perception component 422. For example, an exterior camera of the vehicle may pass an image to the perception component 422 which identifies what clothing the user is wearing or other indicators of user condition. Based on this perception, a perceived condition of the user may be determined upon arrival at the user's pick-up location. Within the vehicle, an interior camera may determine actions and behavior of the user and determine, based on the actions and behavior of the user a perceived condition, from which a climate control setting may be determined. A thermal imagery camera may determine a body heat of the user, for use in determining a perceived condition.

The perception component 422 may be configured to perform object detection, segmentation, and/or classification. In some examples, the perception component 422 may provide processed sensor data that indicates a presence of an entity that is proximate to the vehicle 402 and/or a classification of the entity as an entity type (e.g., car, pedestrian, cyclist, animal, building, tree, road surface, curb, sidewalk, unknown, etc.). In additional and/or alternative examples, the perception component 422 may provide processed sensor data that indicates one or more characteristics associated with a detected entity and/or the environment in which the entity is positioned. Characteristics associated with the environment may include, but are not limited to, a presence of another entity in the environment, a state of another entity in the environment, a time of day, a day of a week, a season, a weather condition, an indication of darkness/light, etc.

Although the predicted and perceived condition of the user is discussed above in relation to a user currently occupying a region, it will be appreciated that these characteristics may also be used by the vehicle to determine a climate control setting for an unoccupied region. While the perception of the user condition based on behavior cannot be determined for an unoccupied region until the user occupies the region, the behavior of the user may be determined in other ways, such as from a camera in a device of the user, using cameras of other vehicles that pass the user prior to the user being picked up or based on health data received from a wearable device of the user.

The determination of a climate control setting for a region may be performed utilizing machine learning, whereby a model is generated configured to output a climate control setting based on inputs relating to the user as described above, and below.

In the other instance shown in FIG. 1, a region can be determined to be unoccupied, and the climate control settings can be based on at least characteristic data 312 associated with a predicted potential change in occupancy status of the region. The characteristic data 312 on which the setting are based may comprise, among others, one or more journey characteristics 314 including a journey type characteristic, a destination characteristic, a current location characteristic, a destination type characteristic, a historic trend, a time of day, a population density, or a length of a current trip, The characteristic data 312 may comprise one or more vehicle characteristics 316, including a vehicle booking characteristic or a current occupancy of the vehicle. The characteristics 312 may comprise user characteristics 318, such as those described above, including user preference data relating to a future user, user preference data relating to a current user of the vehicle, and/or historic user preference data.

An example of a journey type characteristic may comprise a categorization of the journey by length, by destination, by urgency, and/or by environment. Based on a journey type characteristic, potential changes in occupancy of the unoccupied region may be predicted because the journey type relates to how often the vehicle may stop to pick-up a user, in what sort of environments a vehicle may stop, and/or power usage by the vehicle during the journey. How often the vehicle may stop, which may be referred to as a pick-up frequency, changes how closely the climate should be controlled relevant to a typical target temperature. A high pick-up frequency means that occupancy of the unoccupied region is highly likely in a short time period, and thus the climate should be regulated to be closer to climates desired by users. Furthermore, a high pick-up frequency also leads to longer periods in which the doors of the vehicle are open, thereby increasing the influence on the climate within the vehicle. On the other hand, where a journey characteristic indicates that the pick-up frequency is low, the climate may be less closely regulated because it can be predicted that potential changes of occupancy are unlikely in the near future.

Destination characteristics, current location characteristics, population density, and destination type characteristics all also influence the frequency of pick-up in a similar way. For example, a destination type characteristic may indicate an urban or a rural environment, whereas a destination characteristic may indicate that, despite a rural environment, the destination is an area associated with a large number of people. For example, a concert venue may be rural but may lead to a high pick-up at the end of a concert. Accordingly, based on these characteristics, frequency of pick-up can be inferred and a predicted potential change in occupancy derived, from which the climate control setting can be determined. Current location characteristics may be utilized to access data relating to the location from other vehicles or sensors within that location and determine the potential for changes in occupancy.

Where the characteristic data comprises a time of day, this may influence pick-up frequency and may also influence how users react to particular climates. Specifically, a vehicle operating late of night may have a climate control setting that is warmer than would be provided during the day, because users are more likely to specify target temperatures that are warmer once they occupy the vehicle.

The characteristic data may be determined based on one or more components of the vehicle computing device. Specifically, journey characteristics may be determined based on one or more maps 428, the localization component 420, the planning component 424 and the perception component 422. The perception component 422 has been briefly described above, and the localization component 420 and planning component 424 and maps 428 will now be briefly described.

The localization component 420 may be configured to receive data from the sensor system(s) 406 to determine a position and/or orientation of the vehicle 402 (e.g., one or more of an x-, y-, z-position, roll, pitch, or yaw). For example, the localization component 420 may include and/or request/receive a map 428 of an environment and may continuously determine a location and/or orientation of the autonomous vehicle within the map 428.

In general, the planning component 424 may determine a path for the vehicle 402 to follow to traverse through an environment. For example, the planning component 424 may determine various routes and trajectories and various levels of detail. For example, the planning component 424 may determine a route to travel from a first location (e.g., a current location) to a second location (e.g., a target location). For the purpose of this discussion, a route may be a sequence of waypoints for travelling between two locations. As non-limiting examples, waypoints include streets, intersections, global positioning system (GPS) coordinates, etc. Further, the planning component 424 may generate an instruction for guiding the autonomous vehicle along at least a portion of the route from the first location to the second location. In at least one example, the planning component 424 may determine how to guide the autonomous vehicle from a first waypoint in the sequence of waypoints to a second waypoint in the sequence of waypoints. In some examples, the instruction may be a trajectory or a portion of a trajectory. In some examples, multiple trajectories may be substantially simultaneously generated (e.g., within technical tolerances) in accordance with a receding horizon technique, wherein one of the multiple trajectories is selected for the vehicle 402 to navigate.

In at least one example, the planning component 424 may determine a location of a user based on image data of an environment received from the user using, for example, bags of binary words with image based features, artificial neural network, and the like. Further, the planning component 424 may determine a pickup location associated with a location. A pickup location may be a specific location (e.g., a parking space, a loading zone, a portion of a ground surface, etc.) within a threshold distance of a location (e.g., an address or location associated with a dispatch request) where the vehicle 402 may stop to pick up a passenger. In at least one example, the planning component 424 may determine a pickup location based at least in part on determining a user identity (e.g., determined via image recognition or received as an indication from a user device, as discussed herein).

The maps 428 may be used by the vehicle 402 to navigate within the environment. For the purpose of this discussion, a map may be any number of data structures modeled in two dimensions, three dimensions, or N dimensions that are capable of providing information about an environment, such as, but not limited to, topologies (such as intersections), streets, mountain ranges, roads, terrain, and the environment in general. In some examples, multiple maps 428 may be stored based on, for example, a characteristic (e.g., type of entity, time of day, day of week, season of the year, etc.). Storing multiple maps 428 may have similar memory requirements, but increase the speed at which data in a map may be accessed.

Historical trend data may be provided to the vehicle from the server 432 which may coordinate and store data relating to different circumstances at one or more databases. Alternatively, or additionally, the memory 418 may configured to store data relating to previous journeys associating location or time data with climate control data. Based on this stored data, the climate controller 120 may determine characteristic trends associated with predicted changes in occupancy and control the climate of the vehicle accordingly.

The climate control setting may also be based on a vehicle characteristic 316 such as a vehicle booking characteristic. In FIG. 3, a server 432 is provided which operates a booking system 434 with which a user may communicate to request transportation using a user device 440. The booking system 434 directs requests to suitable vehicles. In other embodiments the user device 440 may communicate directly with the vehicle 402.

A booking characteristic may therefore be determined, relating to whether or not a booking is active for the vehicle, i.e. a user has requested transportation from the vehicle, and data relating to the active booking. A booking characteristic may also relate to the type of booking. For example, a booking may be a whole-vehicle booking, such that the vehicle is controlled to fulfil the current booking only before other users are permitted to enter the vehicle. Alternatively, a region booking system may be implemented, to allow multiple users to occupy the region at different times, the different users having different bookings and therefore taking different journeys between different pick-up and destination locations.

A booking characteristic may comprise a booking characteristic for a booking relating to a user occupying another region of the vehicle, i.e. the first region 114*a* in FIG. 1, or a booking characteristic for a booking relating to a user that has not yet been picked up. Where the booking characteristic is for a booking relating to the user occupying another region of the vehicle, this may relate to a whole-vehicle booking, as described above. A user may book the whole vehicle as opposed to booking transportation only, so that they and anyone else they booked for may be alone in the vehicle and their ride is not interrupted by other users being picked up. Accordingly, while a booking for another region indicates that the whole vehicle is unable to be booked by further users, the climate controller 120 may base the determination of the climate control setting for unoccupied regions on this information as it can be predicted that there is no potential for change in occupancy of that region until the end of the current journey.

The booking characteristic may therefore function as both a characteristic associated with a predicted change in occupancy and an indication of the occupancy status of a different region to the unoccupied region for which the climate control setting is determined.

In an example, methods and systems may be provided in which the booking characteristic is provided within booking data. In this example, booking data may be received by autonomous vehicle 102 that comprise one or more booking characteristics. A seating position of a user may be determined, and, based on the occupation of a seat by the user, a climate control setting for that seat, such as a temperature setting, may be determined for that seat. A climate control system, such as an HVAC may be controlled accordingly. In line with the methods and systems herein, it may also be determined that a seat in a second region is unoccupied by a user. Based on this determination that the seat is unoccupied, a different climate control setting, such as a second temperature setting, is determined. The second temperature setting may be based on the booking characteristic indicated by the booking data.

In the above example, therefore, the booking characteristic derived from or found in the booking data is used as the characteristic associated with the predicted potential change in occupancy status. The booking data may comprise a destination of the user. The booking data may also indicate that the user has booked out the entire vehicle such that no further booking data can be received before arrival at the destination. Alternatively, the booking data may indicate that the user has not booked the vehicle, so that other users may enter and exit the vehicle before arrival at the destination of the user in the seat. The climate control setting for the unoccupied region may be determined accordingly, and the climate control system controlled according to the climate control setting. Where the vehicle is booked, the climate control system may be controlled to delay implementation of the climate setting until close to when the vehicle arrives at the destination. Alternatively, when the vehicle is not booked, the climate control system may be controlled to implement the climate control setting for the unoccupied region in advance of receiving another booking. This advance implementation may be based on other characteristics as have been described above, and as are described below, such as environmental or journey characteristics.

In some examples, to determine a climate control setting, an estimated time indicative of the second region potentially becoming occupied may be determined. The characteristic data associated with the predicted potential change of occupancy on which the climate control setting is based may comprise the estimated time. The use of an estimated time as a characteristic may be used alone or in combination with other characteristics.

Where a whole-vehicle booking is active, the estimated time may comprise an estimated time for the remainder of the current journey. If further bookings are active for the end of the journey, the climate controller 120 may determine the time to travel between the destination location at the end of the current journey and the next pick-up location, and use this, combined with the remaining journey time as the estimated time.

Estimated times may be based on data determined from the localization component 420, planning component 424 and maps 428 of the vehicle 402, as well as the data from the booking system 434.

When utilizing an estimated time to determine the climate control setting for an unoccupied region, the climate controller 120 may determine an adjustment time. The adjustment time maybe a time required to adjust the climate of the unoccupied region according to the climate control setting. Based on the adjustment time, the climate controller 120 may delay adjustment of the climate of the second region if the adjustment time is exceeded by the estimated time. In other words, the climate controller 120 may control the climate of unoccupied regions strategically based on when a future event is expected to occur.

As a specific example, in a scenario in which a user is being transported to a distant location on highways and other roads where pick-up of users is not permitted, or where a whole-vehicle booking is active, the climate controller 120 can determine that a minimum estimated time for an unoccupied region to become occupied is the remaining time of the current journey. Accordingly, this estimated time may be compared with an adjustment time. If, therefore, the remaining time is 10 minutes, but the adjustment time is 4 minutes, the climate controller 120 may delay control of the climate in the unoccupied region until the remaining, estimated time is 4 minutes and begin to control the climate of the unoccupied region. Where a subsequent booking is known, the second region may potentially become occupied later, and the different between these times may be added to the estimated time, such that the delay in adjusting the climate of the unoccupied region is longer.

A booking characteristic relating to a booking for a user that has not yet been picked-up may be utilized to determine particular data relating to the user's preferences, such that the region can be prepared for the user entering the vehicle in advance. The climate controller 120 may determine an estimated time from the booking, and/or pick-up location characteristics.

In some examples, the booking for a user that has not yet been picked-up may relate to a user who will occupy a different region. In other words, when determining a climate control setting for an unoccupied region, a booking for a different region for a user who has not yet been picked-up may be used as a characteristic on which the climate control setting for the unoccupied region is based. For example, in a situation where the more than one region of the vehicle is unoccupied or due to be unoccupied and it is possible that the user may sit in any of these regions, the climate control setting for each of those regions may be set to account for this. Similarly, in a situation in which a vehicle has been entirely unoccupied and a climate control setting has allowed a temperature of the vehicle to rise to a high level, the receipt of a booking relating to a user who will occupy a different region may cause control of the climates in each of the unoccupied regions to ensure that the user who will be picked-up will be comfortable and that the energy expenditure required to maintain the user's preferred climate is not excessive due to contamination of the climate of that region by the climate of the other unoccupied regions.

A climate control setting may be based on a booking state of the vehicle. For example, a vehicle may be in one of a plurality of booking states, selected from an unbookable state, in which no further booking of the vehicle is permitted, a bookable state, in which further booking of the vehicle is permitted but no further booking is yet active, and a booked state, in which a further booking of the vehicle is active with respect to a user that remains to be picked up. Where the climate control setting is based on a booking state, the climate control system is controlled to adjust a climate of the second region in a first mode for the vehicle in the unbookable state, a second mode for the vehicle in the bookable state, and a third mode for the vehicle in the booked state.

Booking states can provide a useful indicator of potential changes in occupancy status for the vehicle, because there are distinct changes in occupancy and expected change in occupancy between each state. In an unbookable state, the climate control can be minimized due to there being no occupants in any region and the potential change in occupancy being unlikely.

Once the vehicle moves to a bookable state, there is a possibility that a booking may be received, and so the second mode of control may be more specific than the first, ensuring that the climate control settings for all regions maintain the climate closer to a likely user preferred climate.

Then, when a booking state is entered, the vehicle may be travelling to pick up a user, and so can definitively control the climate accordingly in at least one of the regions. For example, in the third mode, the climate may be controlled according to achieve a user preference by the time the user is picked up, so that the climate in the region the user eventually occupies is suitable for their needs.

In summary, therefore, characteristic data 312 associated with a predicted potential change in occupancy status may be input to a climate model 320 to determine one or more climate control settings for a region of a vehicle. The climate model 320 may be configured to determine, based on the characteristic data 312, a climate control setting for an unoccupied region. The climate model 320 may comprise an algorithm, machine learned, or virtual model of the interior of the vehicle, and the climate model 320 may be configured to solve an optimization problem based on the inputs to the model 320 in order to generate one or more climate control settings. The optimization problem may be to minimize energy usage of the climate control system while maintaining current and future user comfort.

Figure 5:
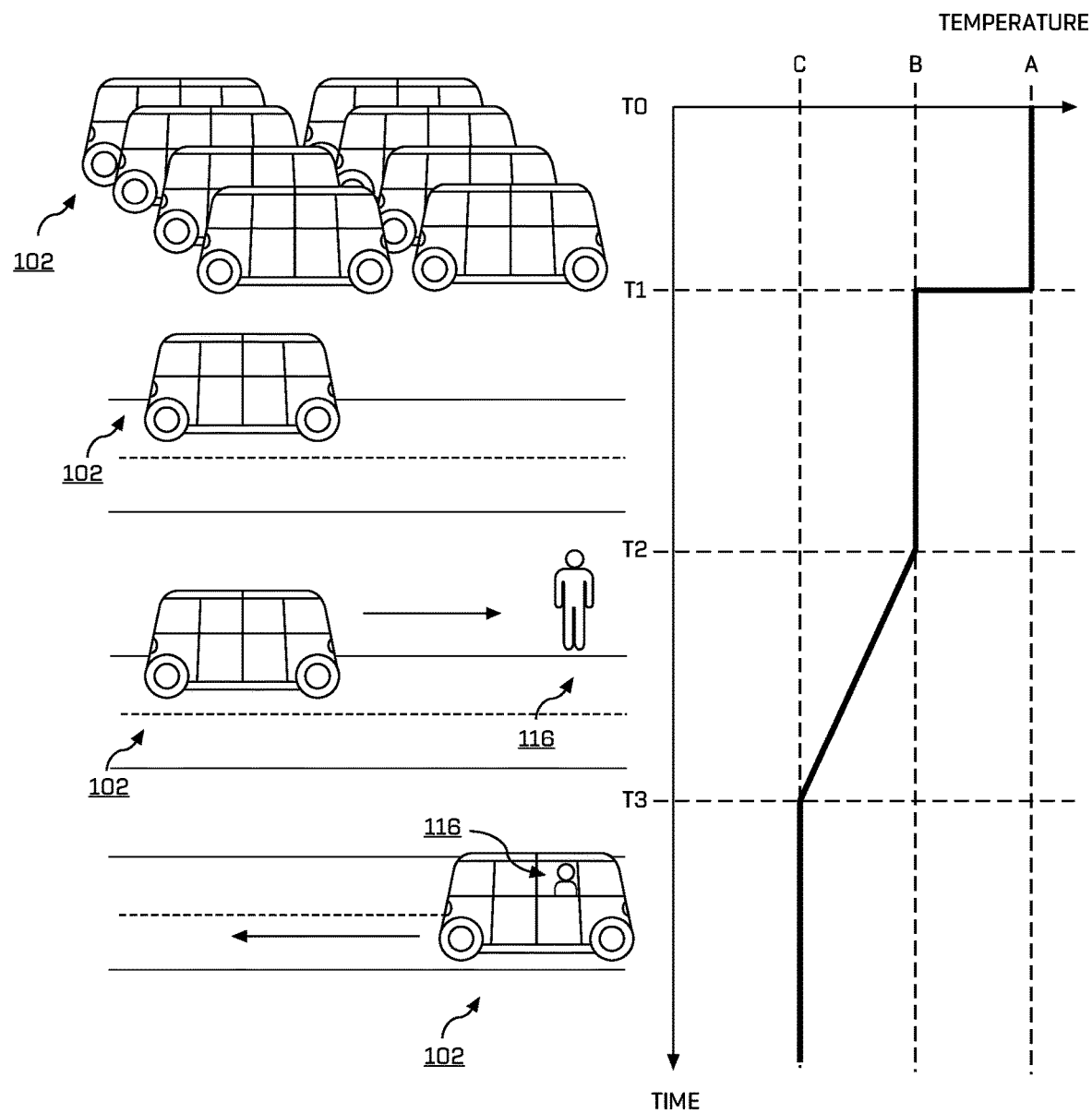
FIG. 5 is a pictorial representation and graph indicating a relationship between climate control and characteristics of an autonomous vehicle.
Figure 6:
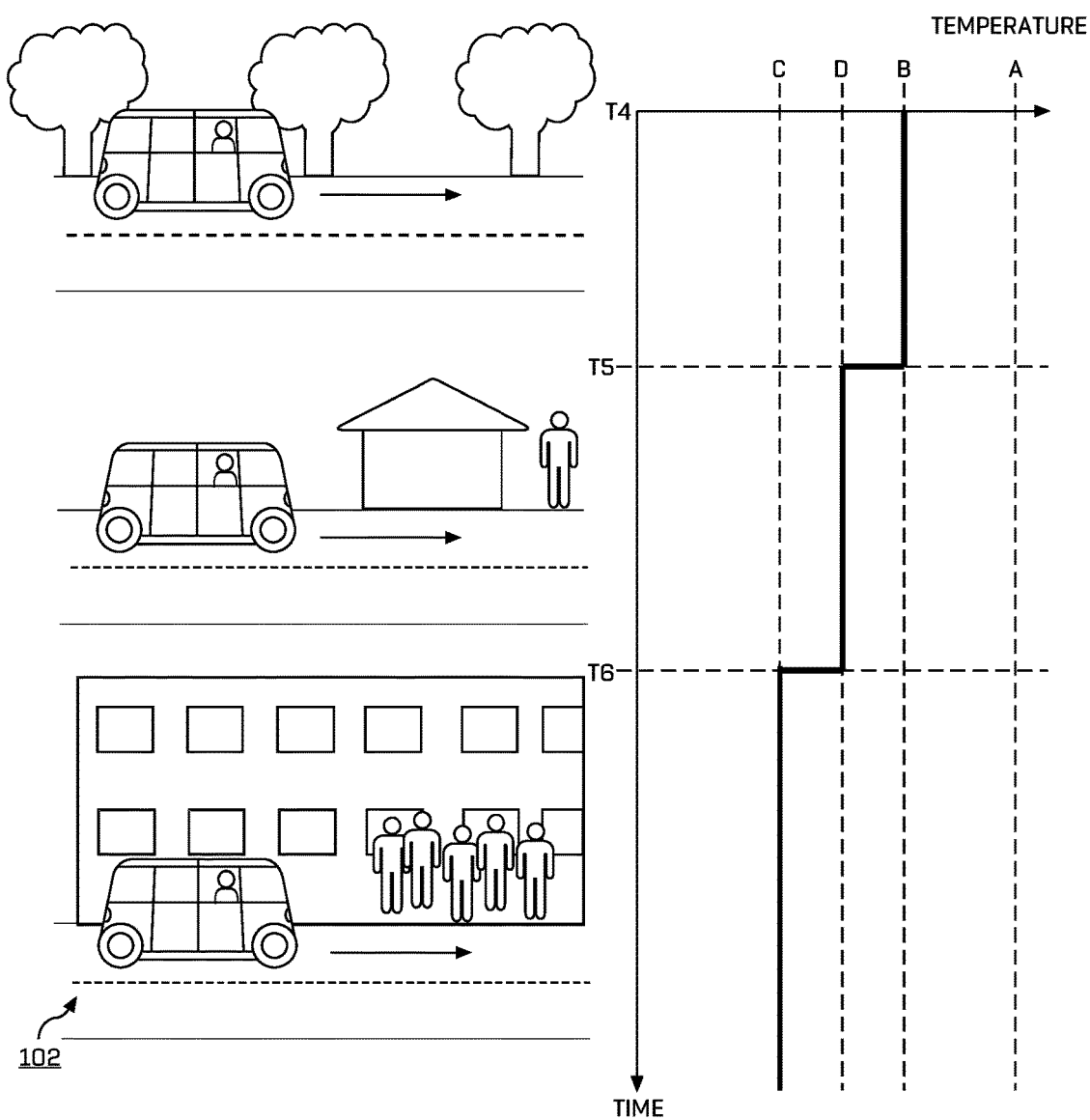
FIG. 6 is another pictorial representation and graph indicating a relationship between climate control and characteristics of an autonomous vehicle.

FIG. 5 and FIG. 6 provide example scenarios illustrating the above considerations and use of characteristics to determine climate control settings. In FIG. 5 and FIG. 6, a scenario is provided alongside which a chart of a temperature setting over time is provided. A temperature setting is used in these illustrated example scenarios as the climate control setting for ease of explanation, but it will be appreciated that the climate control settings may be any variable or combination of variables associated with climate control (e.g., heating, cooling, humidity, ventilation, etc.). Moreover, it will be appreciated that this is the setting specified by the climate controller 120 for the climate control system 118 to follow. Therefore, the actual temperature of a region may differ from this due to changes, but the actual temperature is compared against the temperature setting and the setting is the set point or limit point according to which the climate control system 118 is controlled.

Initially in FIG. 5, the vehicle 102 is idle, and in an unbookable state. It is shown here parked with other vehicles of a similar type. When the process 128 of FIG. 1 or the method of FIG. 2 is applied, the climate controller 120 may determine that all four regions within the vehicle 102 are unoccupied. Therefore, for each region, a climate control setting is determined based on a characteristic which in this circumstance is a vehicle booking characteristic, comprising received booking data indicating that the vehicle is unable to take bookings. The characteristic indicates that the potential for a change in occupancy is very low, due to the unbookable state of the vehicle, and so the temperature setting of each region may be controlled according to a relatively high limit value, temperature A. Only when the temperature inside the vehicle exceeds the temperature setting does the climate controller 120 operate the climate control system 118.

In an unbookable state, in which all regions are unoccupied, the climate control setting may in some examples be a lack of any setting so that no control is exercised whatsoever, thereby conserving as much energy as possible.

As all four regions are in the same state, it may also be that the climate controller 120 controls all four regions in the same way, so that a climate control setting determined for one region is determined for all four regions.

At time T1, the booking data for the vehicle 102 cause the vehicle to change its state to a bookable state. In this state, the vehicle may begin travelling, for example from a location at which it was parked to a location close to which it may receive bookings. As the chance of occupancy of at least one region is now higher, due to bookings of the vehicle being allowed, the climate controller 120 acts to control the climate within the vehicle according to a different, lower temperature setting, which is temperature level B. Therefore, immediately after T1, the climate controller 120 operates the climate control system 118 to bring the temperature level down beneath the level B, and maintains it at that level by operating the climate control system 118 when it exceeds the level B.

By reducing the limit temperature down to a different level, and thereby implementing a more precise climate control setting and one that is closer to a potential occupied climate, the vehicle ensures that it is ready to receive a user within its interior and can adapt to the change in occupancy relatively quickly, without wasting energy by reducing all the way down to the user climate indicated at temperature C.

At time T2, booking data relating to a booking are received and the booked state is entered. The vehicle begins its journey to the user's pick-up location. The user's preferred climate is known as temperature C, and so between times T2 and T3, when the user is picked up, the temperature setting is controlled to move from temperature B to temperature C. After pick-up, the temperature setting is set at the user preference temperature level, temperature C.

The chart in FIG. 5 illustrates the variations in temperature setting of the region that is eventually occupied. For the regions that will remain unoccupied, the climate control setting may remain at temperature B. If it is not known which region will be occupied by the user, the climate control setting of all regions may be set at a level from which a user preference is attainable or at the user preference level, until the user enters the vehicle.

Therefore, between times T0 and T1, the climate control setting for a first region is determined based on the other regions of the vehicle being unoccupied and the characteristic that the vehicle is in an unbookable state. Accordingly, the allowed temperature is relatively high because there is a low likelihood of a change in occupancy and therefore there is no need to expend energy on cooling the interior. Between times T1 and T2, the climate control setting for the first region is determined based on the other regions of the vehicle being unoccupied and the characteristic that the vehicle is in a bookable state. The allowed temperature is lower than between T0 and T1 because there is a higher likelihood of a change in occupancy, and so the vehicle has to be readied for this potential change. Between times T2 and T3, the climate control setting for the first region is determined based on the other regions of the vehicle being unoccupied and the characteristic that the vehicle is in a booked state. The vehicle may determine the estimated time between T2 and T3 and set the gradient of change between the current temperature at T2 and the desired temperature at T3 according to the estimated time. From time T3 onwards, the allowed temperature is set at its lowest level because this is a user setting.

It can therefore be seen that there is a change in climate control settings for unoccupied regions from least control to most control when moving from a low potential for changes in occupancy to a higher potential, and to a definite change in occupancy.

FIG. 6 is a similarly pictorial diagram with a corresponding temperature setting chart representing different scenarios and how the climate control setting is set accordingly. In FIG. 6, the temperature setting is for an unoccupied region of the vehicle 102. The vehicle in FIG. 6 already has a user occupying a first region. The unoccupied region climate control setting is partially based on this user occupying the first region, and therefore the temperature setting is maintained at or below a maximum level that avoids influencing or contaminating the climate in the first region. If, in this example, the temperature setting of an unoccupied region permitted a temperature to rise to temperature A, the user in the first region may be uncomfortable, and so therefore energy is expended to maintain the temperature at temperature B or below to maintain comfort of the user in a different region.

In FIG. 6, initially the user's journey is through a rural environment, between times T4 and T5. A characteristic associated with the predicted potential change in occupancy status may comprise a current location characteristic. Here, the current location, between times T4 and T5 is rural and therefore a potential for changes in occupancy is low because there is a lower population density. Therefore, the temperature setting of the unoccupied region is maintained at level B. It will be appreciated that the unoccupied region is not maintained at level A because this is too high and may cause discomfort to the user in the occupied region.

Between times T5 and T6, the vehicle moves to a suburban location, where the population density is higher. This current location characteristic indicates that there is a higher likelihood of changes in occupancy as there are more people who may potentially request a ride in this location. In response, the temperature setting of the unoccupied region is adjusted to a lower level, level D.

After T6, the vehicle enters an urban environment, where there are many more people. The climate control setting is therefore adjusted again, and the temperature setting is set at temperature C which is a lower setting than the temperature D. This is because there is now an even higher potential for changes in occupancy due to the characteristic of the current location indicating that more ride requests may be received in such a location or environment.

In FIG. 6, the temperature of unoccupied regions is controlled based on a temperature range or limit. As shown in FIG. 5, once a booking is received, the setting may be target temperature once a booking is received or a user enters the region. The setting for unoccupied regions may comprise a target temperature, when a booking is received, but prior to the user entering the vehicle the temperature may continue to be controlled according to a limit value or range.

In each of the above scenarios, occupied regions of the vehicle are controlled according to the occupancy of their regions, such that a climate control setting is determined based on the occupancy. Unoccupied regions are controlled based on their occupancy status and on characteristic data associated with a predicted potential change in occupancy.

The characteristic data may comprise booking data, such that the climate control settings of unoccupied regions are set based on booking data for the unoccupied regions and/or for occupied regions. In some of the examples described above, the characteristic data comprises other data such as environmental characteristics indicating potential booking data. In these examples, the climate control setting of unoccupied regions may be controlled according to these characteristics as well as the occupancy status of other regions of the vehicle, whether that occupancy status is based on booking data or otherwise determined.

Furthermore, the unoccupied and occupied temperature settings for the regions may be shared between regions, such that, in the scenario of FIG. 6, the setting for the unoccupied regions is used when the occupied regions become unoccupied. In other words, a HVAC or other climate control system may be controlled to transfer between different settings upon change of occupancy, the settings having been determined prior to the change of occupancy for unoccupied and occupied regions.

EXAMPLE CLAUSES

A: A system comprising: a heating, ventilation, and air conditioning, HVAC, system; one or more processors; and one or more non-transitory computer-readable media storing instructions executable by the one or more processors, wherein the instructions, when executed, cause the system to perform operations comprising: receiving booking data associated with a booking for an autonomous vehicle operating as a robotic taxi, the booking data including one or more vehicle booking characteristics; determining that a first seating position, within a cabin of the autonomous vehicle, is occupied by a user; determining, based at least in part on the first seating position being occupied, a first temperature setting for the first seating position; controlling the HVAC system using the first temperature setting for the first seating position; determining that a second seating position, within the cabin of the autonomous vehicle, is unoccupied; determining, based at least in part on the second seating position being unoccupied, a second temperature setting for the second seating position, the second temperature setting being based at least partly on the booking data; and controlling the HVAC system using the second temperature setting for the second seating position.

B: A system as paragraph A describes, wherein the first temperature setting is a target temperature setting, wherein the second temperature setting is a target temperature setting and wherein the instructions, when executed, cause the system to control the HVAC system to maintain the second seating position within a temperature range or limit, before using the second temperature setting for the second seating position.

C: A system as paragraph A and/or B describes, wherein the booking data: i) comprise a destination for the user occupying the first seating position; and ii) indicate that the user occupying the first seating position has exclusively booked the vehicle, and that no other booking will be accepted to potentially occupy the second seating position before the vehicle arrives at the destination, and wherein the instructions, when executed, cause the system to change the HVAC system to the second temperature setting before the vehicle arrives at the destination.

D: A system as paragraph A and/or B describes, wherein the booking data: i) comprise a destination for the user occupying the first seating position; and ii) indicate that the user occupying the first seating position has not exclusively booked the vehicle, and that further booking data may be received relating to a further booking to potentially occupy the second seating position before the vehicle arrives at the destination, and wherein the instructions, when executed, cause the system to change the HVAC system to the second temperature setting in preparation for the potential occupation of the second seating position before the further booking data is received.

E: A method comprising: determining a first occupancy status associated with a first region of a vehicle; determining, based at least in part on the first occupancy status, a first climate control setting for the first region; controlling a climate control system of the vehicle to adjust a climate of the first region according to the first climate control setting; determining a second occupancy status associated with a second region of the vehicle, wherein the second region is fluidly connected to the first region; determining, based at least in part on the second occupancy status, a second climate control setting, wherein the second climate control setting is based at least in part on characteristic data associated with a predicted potential change in occupancy status for the second region; and controlling the climate control system to adjust a climate of the second region according to the second climate control setting.

F: A method as paragraph E describes, wherein the characteristic data associated with the predicted potential change in occupancy status comprises a vehicle booking characteristic.

G: A method as paragraph F describes, wherein the vehicle booking characteristic comprises an estimated time indicative of the second region potentially becoming occupied.

H: A method as paragraph G describes, comprising: determining a time required to adjust the climate of the second region according to the second climate control setting; and delaying adjustment of the climate of the second region according to the second climate control setting if the estimated time exceeds the time required.

I: A method as paragraph F describes, wherein the vehicle booking characteristic comprises at least one of: a booking characteristic for a booking relating to a user occupying the first region; or a booking characteristic for a booking relating to a user that has not yet been picked up.

J: A method as any one or more of paragraphs E to I describes, wherein the second climate control setting is based at least in part on the first climate control setting.

K: A method as any one or more of paragraphs E to J describes, wherein the second climate control setting is based on at least one of: user preference data; a current temperature inside the second region; a current ambient temperature outside of the vehicle; a measure of solar load of the vehicle; an estimated climate loss within the vehicle due to operation of a door of the vehicle; an estimated thermal load of a user; a vehicle power source parameter; or a measure of humidity of the interior of the vehicle.

L: A method as any one or more of paragraphs E to K describes, wherein the second climate control setting is based on at least one of: a rate of travel of the vehicle; a rate of acceleration of the vehicle; or a direction of travel of the vehicle.

M: A method as any one or more of paragraphs E to L describes, wherein the characteristic data associated with the predicted potential change in occupancy for the second region comprises at least one of: a journey type characteristic; a destination characteristic; a current location characteristic; a destination type characteristic; a historic trend; a time of day; a population density; a length of a current trip; or a current occupancy of the vehicle.

N: A method as any one or more of paragraphs E to M describes, the method comprising: determining that a third region of the vehicle is unoccupied, wherein the third region is fluidly connected to the first region; determining, based at least in part on the third region being unoccupied, a third climate control setting that is different to the second climate control setting; and controlling the climate control system to adjust a climate of the third region according to the third climate control setting.

O: A method as any one or more of paragraphs E to N describes, wherein the method comprises: determining a climate control objective for the second region, the climate control objective representing a first target climate from which a second target climate is attainable within a predetermined time; and determining the climate control objective as the second climate control setting.

P: A method as any one or more of paragraphs E to O describes, the method comprising: estimating a climate to which the second region would converge without independent climate control in the second region by the climate control system; and determining the second climate control setting based on the estimated climate.

Q: A method as any one or more of paragraphs E to P describes, wherein the second climate control setting is determined based on at least one of a plurality of occupancy prediction states, wherein the occupancy prediction states comprise: a pickup-requested state in which the vehicle has received a request from a user that remains to be picked up; and a no-pickup-requested state in which the vehicle has not received a request from a user that remains to be picked up.

R: A method as any one or more of paragraphs E to Q describes, wherein the second climate control setting is based on booking states of the vehicle, wherein the booking states comprise: an unbookable state in which no further booking of the vehicle is permitted; a bookable state in which further booking of the vehicle is permitted but no further booking is yet active; and a booked state in which a further booking of the vehicle is active with respect to a user that remains to be picked up, and wherein the method comprises controlling the climate control system to adjust a climate of the second region in: a first mode for the vehicle in the unbookable state; a second mode for the vehicle in the bookable state; and a third mode for the vehicle in the booked state.

S: A method as any one or more of paragraphs E to Q describes, further comprising: determining a future condition of the vehicle based at least in part on use of the vehicle by a user corresponding to the first region of the vehicle, wherein the second climate control setting is based at least in part on the future condition.

T: One or more non-transitory computer-readable media storing instructions executable by one or more processors, wherein the instructions, when executed, cause the one or more processors to perform operations comprising: determining a first occupancy status associated with a first region of a vehicle; determining, based at least in part on the first occupancy status, a first climate control setting for the first region; controlling a climate control system of the vehicle to adjust a climate of the first region according to the first climate control setting; determining a second occupancy status associated with a second region of the vehicle, wherein the second region is fluidly connected to the first region; determining, based at least in part on the second occupancy status, a second climate control setting, wherein the second climate control setting is based at least in part on characteristic data associated with a predicted potential change in occupancy status for the second region; and controlling the climate control system to adjust a climate of the second region according to the second climate control setting.

While the example clauses described above are described with respect to one particular implementation, it should be understood that, in the context of this document, the content of the example clauses can also be implemented via a method, device, system, computer-readable medium, and/or another implementation. Additionally, any of examples A to T may be implemented alone or in combination with any other one or more of the examples A to T.

What is claimed is:

1. A system comprising:
   a heating, ventilation, and air conditioning, HVAC, system;
   one or more processors; and
   one or more non-transitory computer-readable media storing instructions executable by the one or more processors, wherein the instructions, when executed, cause the system to perform operations comprising:
   receiving booking data associated with a booking for an autonomous vehicle operating as a robotic taxi, the booking data including one or more vehicle booking characteristics;
   determining that a first seating position, within a cabin of the autonomous vehicle, is occupied by a user;
   determining, based at least in part on the first seating position being occupied, a first temperature setting for the first seating position;
   controlling the HVAC system using the first temperature setting for the first seating position;
   determining that a second seating position, within the cabin of the autonomous vehicle, is unoccupied;
   determining a future condition of the autonomous vehicle based at least in part on use of the vehicle by the user;
   determining, based at least in part on the future condition, the second seating position being unoccupied and the booking data, a second temperature setting for the second seating position; and
   controlling the HVAC system using the second temperature setting for the second seating position.

2. The system of claim 1, wherein the first temperature setting is a target temperature setting, wherein the second temperature setting is a target temperature setting and wherein the instructions, when executed, cause the system to control the HVAC system to maintain the second seating position within a temperature range or limit, before using the second temperature setting for the second seating position.

3. The system of claim 1, wherein the booking data:
   i) comprise a destination for the user occupying the first seating position; and
   ii) indicate that the user occupying the first seating position has exclusively booked the vehicle, and that no other booking will be accepted to potentially occupy the second seating position before the vehicle arrives at the destination, and
   wherein the instructions, when executed, cause the system to change the HVAC system to the second temperature setting before the vehicle arrives at the destination.

4. The system of claim 1, wherein the booking data:
   i) comprise a destination for the user occupying the first seating position; and
   ii) indicate that the user occupying the first seating position has not exclusively booked the vehicle, and that further booking data may be received relating to a further booking to potentially occupy the second seating position before the vehicle arrives at the destination, and wherein the instructions, when executed, cause the system to change the HVAC system to the second temperature setting in preparation for the potential occupation of the second seating position before the further booking data is received.

5. A method comprising:

determining a first occupancy status associated with a first region of a vehicle;

determining, based at least in part on the first occupancy status, a first climate control setting for the first region;

controlling a climate control system of the vehicle to adjust a climate of the first region according to the first climate control setting;

determining a second occupancy status associated with a second region of the vehicle, wherein the second region is fluidly coupled to the first region;

determining a future condition of the vehicle based at least in part on use of the vehicle by a user corresponding to the first region of the vehicle;

determining, based at least in part on the second occupancy status and at least in part on the future condition, a second climate control setting, wherein the second climate control setting is based at least in part on characteristic data associated with a predicted potential change in occupancy status for the second region; and controlling the climate control system to adjust a climate of the second region according to the second climate control setting.

6. The method of claim 5, wherein the characteristic data associated with the predicted potential change in occupancy status comprises a vehicle booking characteristic.

7. The method of claim 6, wherein the vehicle booking characteristic comprises an estimated time indicative of the second region potentially becoming occupied.

8. The method of claim 7, comprising:

determining a time required to adjust the climate of the second region according to the second climate control setting; and delaying adjustment of the climate of the second region according to the second climate control setting if the estimated time exceeds the time required.

9. The method of claim 6, wherein the vehicle booking characteristic comprises at least one of:

a booking characteristic for a booking relating to a user occupying the first region; or a booking characteristic for a booking relating to a user that has not yet been picked up.

10. The method of claim 5, wherein the second climate control setting is based at least in part on the first climate control setting.

11. The method of claim 5, wherein the second climate control setting is based on at least one of:

user preference data;

a current temperature inside the second region;

a current ambient temperature outside of the vehicle;

a measure of solar load of the vehicle;

an estimated climate loss within the vehicle due to operation of a door of the vehicle;

an estimated thermal load of a user;

a vehicle power source parameter; or a measure of humidity of the interior of the vehicle.

12. The method of claim 5, wherein the second climate control setting is based on at least one of:

a rate of travel of the vehicle;

a rate of acceleration of the vehicle; or a direction of travel of the vehicle.

13. The method of claim 5, wherein the characteristic data associated with the predicted potential change in occupancy for the second region comprises at least one of:

a journey type characteristic;

a destination characteristic;

a current location characteristic;

a destination type characteristic;

a historic trend;

a time of day;

a population density;

a length of a current trip; or a current occupancy of the vehicle.

14. The method of claim 5, the method comprising:

determining that a third region of the vehicle is unoccupied, wherein the third region is fluidly connected to the first region;

determining, based at least in part on the third region being unoccupied, a third climate control setting that is different to the second climate control setting; and controlling the climate control system to adjust a climate of the third region according to the third climate control setting.

15. The method of claim 5, the method comprising:

estimating a climate to which the second region would converge without independent climate control in the second region by the climate control system; and determining the second climate control setting based on the estimated climate.

16. The method of claim 5, wherein the second climate control setting is determined based on at least one of a plurality of occupancy prediction states, wherein the occupancy prediction states comprise:

a pickup-requested state in which the vehicle has received a request from a user that remains to be picked up; and a no-pickup-requested state in which the vehicle has not received a request from a user that remains to be picked up.

17. The method of claim 5, wherein the second climate control setting is based on booking states of the vehicle, wherein the booking states comprise:

an unbookable state in which no further booking of the vehicle is permitted;

a bookable state in which further booking of the vehicle is permitted but no further booking is yet active; and a booked state in which a further booking of the vehicle is active with respect to a user that remains to be picked up, and wherein the method comprises controlling the climate control system to adjust a climate of the second region in:

a first mode for the vehicle in the unbookable state;

a second mode for the vehicle in the bookable state; and a third mode for the vehicle in the booked state.

18. One or more non-transitory computer-readable media storing instructions executable by one or more processors, wherein the instructions, when executed, cause the one or more processors to perform operations comprising:

determining a first occupancy status associated with a first region of a vehicle;

determining, based at least in part on the first occupancy status, a first climate control setting for the first region;

controlling a climate control system of the vehicle to adjust a climate of the first region according to the first climate control setting;

determining a second occupancy status associated with a second region of the vehicle, wherein the second region is fluidly connected to the first region;

determining a climate control objective for the second region, the climate control objective representing a first target climate from which a second target climate is attainable within a predetermined time;

determining, based at least in part on the second occupancy, a second climate control setting as the climate control objective, wherein the second climate control setting is based at least in part on characteristic data associated with a predicted potential change in occupancy status for the second region; and controlling the climate control system to adjust a climate of the second region according to the second climate control setting.

* * * * *